United States Patent [19]

Tamaki et al.

[11] Patent Number: 5,049,402
[45] Date of Patent: Sep. 17, 1991

[54] PROCESS FOR MINIMIZING BITTERNESS IN CITRUS FRUIT JUICE

[75] Inventors: Yoji Tamaki, Kagamigahara; Osamu Mutsushika, Kasugai; Hiroaki Mieda, Nagoya, all of Japan

[73] Assignee: Pokka Corporation, Japan

[21] Appl. No.: 469,085

[22] Filed: Jan. 23, 1990

[30] Foreign Application Priority Data

Aug. 3, 1989 [JP] Japan ................................. 1-200333
Dec. 5, 1989 [JP] Japan ................................. 1-314164

[51] Int. Cl.$^5$ ............................................. A23L 2/06
[52] U.S. Cl. ..................................... 426/599; 426/616
[58] Field of Search ...................... 426/330.5, 599, 616

[56] References Cited

U.S. PATENT DOCUMENTS

| | | | |
|---|---|---|---|
| 2,935,407 | 5/1960 | Haman | 426/616 |
| 3,989,854 | 11/1976 | Chandler | 426/599 |
| 4,031,265 | 6/1977 | Guadagni | 426/599 |
| 4,332,825 | 6/1982 | Miyawaki | 426/330.5 |
| 4,514,427 | 4/1985 | Mitchell | 426/330.5 |
| 4,915,967 | 4/1990 | Nozaka | 426/599 |
| 4,946,702 | 8/1990 | Stipp | 426/599 |

FOREIGN PATENT DOCUMENTS 0090734 10/1983 European Pat. Off. ............ 426/599

Primary Examiner—Carolyn Paden
Attorney, Agent, or Firm—Venable, Baetjer, Howard & Civiletti

[57] ABSTRACT

Citrus fruit juice beverages with minimized bitterness can be obtained by treating citrus fruit juice under a pressure of at least 2000 Kg/cm$^2$.

5 Claims, No Drawings

PROCESS FOR MINIMIZING BITTERNESS IN CITRUS FRUIT JUICE

BACKGROUND OF THE INVENTION

1. Field of the Invention

This invention relates to a method of treating citrus fruits. More particularly, it relates to a technique for minimizing or removing the bitterness of citrous fruit juice with high bitterness, thereby providing citrous fruit beverages that are pleasant to the taste.

2. Prior Art

With the recent spread of vending machines, fruit juice has been consumed in large quantities. In addition, the diversified consumers' tastes and the general tendency to like healthy and high grade foods have been increasing the demand for beverages containing or composed only of naturl fruit juice instead of conventional drinks containing no fruit juice.

However, some of these natural fruit juice, especially juice of citrus fruits, have strong bitterness, which naturally limits their demand.

To overcome this problem, citrus fruits with strong bitterness are treated in various ways to remove the bitterness. One simple method is to mask the bitter taste by using a large amount of a sweetener or a souring agent. Also known are industrial processes: a method of including bitter components with $\beta$-cyclodextrin (Fragrance Journal, No. 63, 73-79, 1983 ); a method of adsorbing bitter components with a resin or activated charcoal; and a method of degrading naringin (one of bitter components) by the action of an enzyme, such as naringinase.

PROBLEMS TO BE SOLVED

The prior-art methods mentioned above all have disadvantages as described below.

In the method using a large amount of a sweetener or the like, the resulting fruit juice becomes not only excessivley sweet but also excessively high in calorific value, thus losing the healthy nature of natural fruit juice.

In the industrial process using $\beta$-cyclodextrin, this compound is high in cost and also injures the relish inherent to the fruit juice when used in a large quantity, thus reducing its flavor. The process using a resin or the like causes adsorption of the flavor and evolution of a resinous odor, thus adversely affecting the product quality, and the process using an enzyme also causes deterioration of or reduction in flavor. Any of these prior art methods is not satisfactory.

SUMMARY OF THE INVENTION

Means to Solve the Problems

This invention was intended to solve all the problems described above.

An object of this invention is to develop an industrial process to remove the bitterness without causing any change in the other components involved.

A second object of this invention is to develop an industrial system which further improves the process for removing bitterness by high-pressure treatment developed to achieve the above object, thereby making it possible to reduce the amount of bitter components to an equal level invariably (regardless of the amounts involved in original juice) and also to reduce the amounts to a far lower level.

Thoroughgoing studies on the bitter components to achieve the first object described above have led us to find that flavonoids and limonoids (the bitter components of citrus fruits) are different from each other in the nature of bitterness—the bitterness of flavonoids is rather refreshing, while limonoids leave an unpleasant aftertaste—, and that fruit juice bitterness can be substantially removed if the bitterness of limonoids is removed or minimized.

Our investigations were further extended from the viewpoint that the object of this invention could be achieved by reducing the amount of limonoids alone. As a result, it was suggested that physical or mechanical means would be preferable to chemical or biological means for this purpose, and extensive studies were further continued, leading to the accomplishment of this invention.

Thus, the gist of this invention consists in removing or minimizing the bitterness of citrus fruit juice by treating it under a high pressure. According to the process of this invention, the surprising effect can be unexpectedly achieved that the amount of limonoids alone is reduced, with little change in flavonoids (the other bitter component) and other major components.

DETAILED DESCRIPTION OF THE INVENTION

In practicing the process of this invention, citrus fruit juice may be treated under a high pressure by any available means, for example, by the use of any proper pressurizing machines commercially available. The treatment may be carried out at a high pressure for a long period of time; to reconcile economic efficiency and treatment effects, however, it is advisable that a pressure of at least 1200 $Kg/cm^2$, preferably at least 2000 $Kg/cm^2$, be applied for at least 30 seconds, preferably at least one minite. The suitable conditions may vary with the kind of citrus fruit to be treated, but normally treatment at a pressure of at least 2000 $Kg/cm^2$ for one to ten minites or longer is preferred.

As stated above, the treatment under pressure is a very excellent method that removes the bitterness without any change in the other components. However, the rate of reducing the amount of bitter component is nearly constant in this process, and hence the difference in the content of bitter component (limonin) in fruit juice (starting material) is directly reflected in the quality difference in final products. In fact, the content of bitter component in fruit juice varies significantly according to the time of harvest and squeezing, resulting in great quality diferrence in final products. It is therefore difficult to mass-produce products of consistent quality.

The second object of this invention is to solve such a defect of high-pressure treatment, thereby making it possible to reduce the amount of bitter component to an equal level invariably (regardless of the amounts involved in original juice) and also to reduce the amounts to a far lower level.

During the studies to achieve this object, we took notice of the phenomenon that citrus fruits taste less bitter and are pleasant to the taste when eaten raw, while strong bitterness develops if squeezed to prepare fruit juice. The reason is that limonin (the bitter component) exists in raw fruits as limonoate ring-A lactone (tasteless precursor of the same), which is converted to limonin in the squeezed fruit juice [Food Technology, 57, (6), 73-77 (1983 )].

We then noticed the phenomenon that fruit juice exhibits substantially no bitterness immediately after squeezing and that the amount of bitter component increases with the passage of time, eventually giving juice of strong bitterness. We thus hit upon a new idea concerning the relationship between this phenomenon and the above-mentioned pressurizing technique, and tried to apply pressure to fruit juice immediately after squeezing. As a result, we confirmed that no increase in the amount of limonin took place with the passage of time, thus succeeding in achieving the second object of this invention.

Thus, this invention relates to a process for producing citrus fruit juice beverages with minimized bitterness which comprises subjecting fruit juice obtained by squeezing to high-pressure treatment as early as possible after squeezing, thereby preventing the increase in the amount of limonin with the passage of time.

The earlier the time of high-pressure application, the better will be the result obtained; the best result is obtained if the high-pressure treatment is carried out immediately after squeezing. The treating conditions (treating pressure and time) may be as described above.

As examples of the citruses to which the process of this invention can be applied, may be mentioned grapefruits, navel oranges, Iyo oranges, Hassaku oranges, summer oranges, sweet oranges, Unshu mandarin oranges, lemons, kumquats, pomelos and oranges. The high-pressure treatment of this invention is applicable to such a variety of citruses, and the stronger the bitterness of orignal juice, the more marked the effect of treatment. However, even with citruses having weak bitterness, the high-pressure treatment increases sweetness and freshness, giving very delicious juice hitherto unknown. This invention has so far been explained by referring only to citruses, but other fruits and vegetables with a high limonoid content can also be treated satisfactorily according to the process of this invention.

The following examples will further illustrate the invention.

EXAMPLE 1

Using a Mitsubishi high-pressure treatment test apparatus (Model MFP-7000), grapefruit juice produced in Florida of North America was treated under the conditions listed in Table 1, and the limonin content in each treated sample was measured by HPLC. The results obtained are shown in the same table. Brix and limonin content of the original juice were 9.0 and 12.8 ppm, respectively.

Components other than limonin content acidity, vitamin C, amino nitrogen, ashes and Brix) were also analyzed by the methods specified in JAS (treating conditions: 2000 Kg/cm$^2$ × 10 minutes. The results are summarized in Table 2.

TABLE 1

| Pressure | Treating time | | | | |
|---|---|---|---|---|---|
| | 1 min. | 5 mins. | 10 mins. | 20 mins. | 30 mins. |
| 1000 Kg/cm$^2$ | 12.6 | 12.8 | 12.6 | 12.5 | 12.7 |
| 2000 | 11.8 | 9.4 | 5.5 | 5.4 | 5.4 |
| 3000 | 11.9 | 9.2 | 5.6 | 5.3 | 5.8 |
| 4000 | 12.1 | 9.0 | 6.1 | 5.9 | 6.1 |

(Unit: ppm)

TABLE 2

| | Brix | Acidity g/100 g | Vitamin C mg/100 g | Amino Nitrogen mg/100 g | Ashes g/100 g |
|---|---|---|---|---|---|
| Before treatment | 9.0 | 0.93 | 29.3 | 26.3 | 0.27 |
| After treatment | 9.0 | 0.93 | 29.4 | 26.2 | 0.27 |

As is apparent from the above results, it was scientifically confirmed that the high-pressure treatment greatly reduces the amount of limonin with no change in the other components. The treated juice was then provided for drinking and it was actually confirmed that only the bitterness disappeared, with the refreshing flavor inherent to grapefruit being further emphasized.

EXAMPLE 2

Navel oranges produced in Japan were treated, in place of the grapefruits, in the same manner as in Example 1, and the fruit juice thus prepared was analyzed for limonin content and other components in the same way. The results obtained are shown in Tables 3 and 4.

Brix and limonin content before treatment were 10.0 and 9.6 ppm, respectively.

TABLE 3

| Pressure | Treating time | | | | |
|---|---|---|---|---|---|
| | 1 min. | 5 mins. | 10 mins. | 20 mins. | 30 mins. |
| 1000 Kg/cm$^2$ | 9.7 | 9.4 | 9.3 | 9.6 | 9.3 |
| 2000 | 9.6 | 8.1 | 6.1 | 6.2 | 6.1 |
| 3000 | 9.6 | 8.2 | 6.2 | 6.1 | 6.1 |
| 4000 | 9.4 | 8.0 | 6.3 | 6.2 | 6.2 |

(Unit: ppm)

TABLE 4

| | Brix | Acidity g/100 g | Vitamin C mg/100 g | Amino Nitrogen mg/100 g | Ashes g/100 g |
|---|---|---|---|---|---|
| Before treatment | 10.0 | 1.21 | 27.0 | 25.2 | 0.37 |
| After treatment | 10.0 | 1.20 | 26.8 | 25.3 | 0.38 |

It was revealed that the high-pressure treatment selectively removes the bitter component with no change in the other components in this case too. The treated juice, when provided for actual drinking, proved to be very delicious with no bitterness being noted.

EXAMPLE 3

Iyo oranges were treated, in place of the grapefruits, in the same manner as in Example 1, and the fruit juice thus prepared was analyzed for limonin content and other components in the same way. The results obtained are shown in Tables 5 and 6.

Brix and limonin content before treatment were 10.0 and 12.8 ppm, respectively.

TABLE 5

| Pressure | Treating time | | | | |
|---|---|---|---|---|---|
| | 1 min. | 5 mins. | 10 mins. | 20 mins. | 30 mins. |
| 1000 Kg/cm$^2$ | 13.0 | 12.8 | 12.9 | 12.2 | 12.7 |
| 2000 | 12.1 | 10.2 | 8.3 | 8.1 | 8.5 |
| 3000 | 11.8 | 10.6 | 8.1 | 8.3 | 7.9 |
| 4000 | 12.0 | 10.8 | 8.1 | 8.5 | 8.3 |

(Unit: ppm)

TABLE 6

|  | Brix | Acidity g/100 g | Vitamin C mg/100 g | Amino Nitrogen mg/100 g | Ashes g/100 g |
| --- | --- | --- | --- | --- | --- |
| Before treatment | 10.0 | 0.85 | 26.1 | 25.2 | 0.32 |
| After treatment | 10.0 | 0.88 | 26.3 | 25.0 | 0.31 |

It was revealed that the high-pressure treatment selectively removes the bitter component with no change in the other components in this case too. The treated juice, when provided for actual drinking, proved to be very delicious with no bitterness being noted.

EXAMPLE 4

Hassaku oranges were treated, in place of the grapefruits, in the same manner as in Example 1, and the fruit juice thus prepared was analyzed for limonin content and other components in the same way. The results obtained are shown in Tables 7 and 8.

Brix and limonin content before treatment were 11.0 and 16.8 ppm, respectively.

TABLE 7

| Pressure | Treating time | | | | |
| --- | --- | --- | --- | --- | --- |
|  | 1 min. | 5 mins. | 10 mins. | 20 mins. | 30 mins. |
| 1000 Kg/cm² | 16.8 | 16.5 | 16.5 | 16.4 | 16.1 |
| 2000 | 16.2 | 13.4 | 6.0 | 5.9 | 5.8 |
| 3000 | 16.5 | 13.1 | 6.1 | 6.0 | 6.1 |
| 4000 | 16.8 | 13.9 | 6.4 | 6.2 | 6.3 |

(Unit: ppm)

TABLE 8

|  | Brix | Acidity g/100 g | Vitamin C mg/100 g | Amino Nitrogen mg/100 g | Ashes g/100 g |
| --- | --- | --- | --- | --- | --- |
| Before treatment | 11.0 | 1.45 | 46.0 | 39.6 | 0.39 |
| After treatment | 11.0 | 1.40 | 46.2 | 39.1 | 0.38 |

EXAMPLE 5

Using a Mitsubishi high-pressure treatment test apparatus (Model MFP-7000), grapefruits produced in California were squeezed and the amount of limonin in the juice was measured at definite time intervals. In addition, samples thus allowed to stand for definute times after squeezing were each subjectd to high-pressure treatment, and the resulting increase in the amount of limonin was measured. The results obtained are summarized in Table 9.

TABLE 9

|  | Time after squeezing (hr.) | | | | | | | |
| --- | --- | --- | --- | --- | --- | --- | --- | --- |
|  | 0.25 | 0.5 | 1.5 | 2.0 | 4.0 | 6.0 | 24.0 | 48.0 |
| Squeezed juice | 1.55 | 3.2 | 4.4 | 5.1 | 10.7 | 19.2 | 28.0 | 28.6 |
| Treatment 1 | 1.30 | 1.5 | 1.4 | 1.6 | 1.6 | 1.5 | 1.5 | 1.6 |
| Treatment 2 |  | 2.2 | 2.4 | 2.1 | 2.3 | 2.3 | 2.4 | 2.4 |
| Treatment 3 |  |  | 2.8 | 3.0 | 3.0 | 2.9 | 2.8 | 2.9 |
| Treatment 4 |  |  |  | 2.7 | 2.9 | 2.8 | 3.0 | 2.9 |
| Treatment 5 |  |  |  |  | 5.2 | 5.4 | 5.4 | 5.4 |

(Unit: ppm)

Components other than limonin content (acidity, vitamin C, amino nitrogen, ashes and Brix) were also analyzed by the methods specified in JAS, and it was confirmed that no change is caused by the treatment (Table 10).

TABLE 10

|  | Brix | Acidity g/100 g | Vitamin C mg/100 g | Amino Nitrogen mg/100 g | Ashes g/100 g |
| --- | --- | --- | --- | --- | --- |
| Before treatment (just after squeezing) | 9.1 | 0.90 | 38.2 | 26.8 | 0.27 |
| After treatment (treatment 1) | 9.1 | 0.91 | 38.1 | 26.8 | 0.27 |

EXAMPLE 6

Navel orange produced in Japan were treated, in place of the grapefruits, in the same manner as in Example 5, and the increase in the amount of limonin was measured. The results obtained are shown in Table 11.

TABLE 11

|  | Time after squeezing (hr.) | | | | | | | |
| --- | --- | --- | --- | --- | --- | --- | --- | --- |
|  | 0.25 | 0.5 | 1.5 | 2.0 | 4.0 | 6.0 | 24.0 | 48.0 |
| Squeezed juice | 1.0 | 2.0 | 2.8 | 3.2 | 6.7 | 12.0 | 17.5 | 17.9 |
| Treatment 1 | 0.8 | 0.9 | 0.9 | 1.0 | 1.0 | 0.9 | 0.9 | 1.0 |
| Treatment 2 |  | 1.4 | 1.5 | 1.5 | 1.4 | 1.5 | 1.5 | 1.5 |
| Treatment 3 |  |  | 1.8 | 1.9 | 1.9 | 1.9 | 1.9 | 1.9 |
| Treatment 4 |  |  |  | 1.8 | 1.9 | 1.9 | 1.9 | 1.9 |
| Treatment 5 |  |  |  |  | 3.3 | 3.4 | 3.4 | 3.4 |

(Unit: ppm)

Components other than limonin content were also analyzed in the same way, and it was confirmed that no change is caused by the treatment (Table 12).

TABLE 12

|  | Brix | Acidity g/100 g | Vitamin C mg/100 g | Amino Nitrogen mg/100 g | Ashes g/100 g |
| --- | --- | --- | --- | --- | --- |
| Before treatment | 10.1 | 1.07 | 48.2 | 29.6 | 0.43 |

TABLE 12-continued

| | Brix | Acidity g/100 g | Vitamin C mg/100 g | Amino Nitrogen mg/100 g | Ashes g/100 g |
|---|---|---|---|---|---|
| (just after squeezing) After treatment (treatment 1) | 10.0 | 1.07 | 48.3 | 29.8 | 0.43 |

EXAMPLE 7

Iyo oranges were treated, in place of the grapefruits, in the same manner as in Example 5, and the increase in the amount of limonin was measured. The results obtained are shown in Table 13.

TABLE 13

| | Time after squeezing (hr.) | | | | | | |
|---|---|---|---|---|---|---|---|
| | 0.25 | 0.5 | 1.5 | 2.0 | 4.0 | 6.0 | 24.0 | 48.0 |
| Squeezed juice | 0.9 | 1.9 | 2.6 | 3.0 | 6.2 | 11.1 | 16.2 | 16.4 |
| Treatment 1 | 0.7 | 0.8 | 0.7 | 0.7 | 0.8 | 0.8 | 0.8 | 0.8 |
| Treatment 2 | | 1.3 | 1.4 | 1.4 | 1.4 | 1.4 | 1.3 | 1.4 |
| Treatment 3 | | | 1.6 | 1.6 | 1.7 | 1.8 | 1.7 | 1.7 |
| Treatment 4 | | | | 1.8 | 1.9 | 1.9 | 1.9 | 1.9 |
| Treatment 5 | | | | | 3.0 | 3.1 | 3.2 | 3.1 |

(Unit: ppm)

Components other than limonin content were also analyzed in the same way, and it was confirmed that no change is caused by the treatment (Table 14).

TABLE 14

| | Brix | Acidity g/100 g | Vitamin C mg/100 g | Amino Nitrogen mg/100 g | Ashes g/100 g |
|---|---|---|---|---|---|
| Before treatment (just after squeezing) | 11.2 | 1.36 | 38.0 | 26.9 | 0.38 |
| After treatment (treatment 1) | 11.3 | 1.35 | 38.6 | 26.8 | 0.37 |

EXAMPLE 8

Hassaku oranges were treated, in place of the grapefruits, in the same manner as in Example 5, and the increase in the amount of limonin was measured. The results obtained are shown in Table 15.

TABLE 15

| Time after squeezing (hr.) | 0.25 | 0.5 | 1.5 | 2.0 | 4.0 | 6.0 | 24.0 | 48.0 |
|---|---|---|---|---|---|---|---|---|
| Squeezed juice | 1.05 | 2.2 | 3.0 | 3.5 | 7.3 | 13.0 | 18.9 | 18.9 |
| Treatment 1 | 0.9 | 0.9 | 1.0 | 1.0 | 1.0 | 0.9 | 1.0 | 1.0 |
| Treatment 2 | | 1.5 | 1.6 | 1.5 | 1.5 | 1.5 | 1.5 | 1.5 |
| Treatment 3 | | | 1.9 | 1.9 | 2.0 | 2.0 | 2.0 | 2.0 |
| Treatment 4 | | | | 2.1 | 2.2 | 2.2 | 2.2 | 2.2 |
| Treatment 5 | | | | | 3.6 | 3.7 | 3.7 | 3.7 |

(Unit: ppm)

Components other than limonin content were also analyzed in the same way, and it was confirmed that no change is caused by the treatment (Table 16).

TABLE 16

| | Brix | Acidity g/100 g | Vitamin C mg/100 g | Amino Nitrogen mg/100 g | Ashes g/100 g |
|---|---|---|---|---|---|
| Before treatment (just after squeezing) | 11.2 | 1.50 | 45.4 | 25.2 | 0.36 |
| After treatment (treatment 1) | 11.3 | 1.49 | 45.3 | 25.0 | 0.36 |

As is apparent from the results shown above, the high-pressure treatment effectively reduces the limonin content in fruit juice and this effect is more marked when the juice is treated earlier after squeezing. In other words, the treatment is most effective when carried out immediately after squeezing. It was also demonstrated that the increase in the amount of limonin in the juice with the passage of time is prevented by the high-pressure treatment. Furthermore, it was proved that the high-pressure treatment causes no change in the components of fruit juice other than limonin.

Effects Achieved by the Invention

The process of this invention can selectively remove unpleasant bitter components from citrus fruit juice with no change in the other components, thus producing final products with refreshing flavor and new taste hitherto unknown.

The fruit juice produced by the process of this invention has minimized bitterness, with the sweetness inherent to the original fruits being markedly emphasized. Hence, there is no need to further add a sweetener unlike conventional products. This is a great advantage of this invention.

In addition, the process of this invention which is a physical means is free of food pollution hazards unlike the treatment with food additives. It is also very suitable for industrialization because no delicate operation is needed in the treating steps. These effects are more marked if the treatment is carried out immediately after squeezing.

What is claimed is:

1. A process for producing a citrus fruit juice beverage having a reduced limonin content which comprises subjecting fruit juice obtained by squeezing citrus fruit to a pressure of 1200 to 4000 kg/cm$^2$ for 1 to 30 minutes under conditions sufficient to reduce limonin content of said juice.

2. The process of claim 1 wherein the citrus fruit is grapefruit, navel orange, or orange.

3. A process for reducing the bitterness of citrus fruit juice, said bitterness resulting from the presence of limonin in the juice, which comprises subjecting freshly squeezed citrus juice to a pressure of from 1200 to 4000 kg/cm$^2$ for a time where said time is at least about 30 seconds and under conditions sufficient to reduce the limonin content of said juice.

4. The process of claim 3 wherein said pressure is at least 2000 kg/cm$^2$ and said time is from about 1 minute to about 30 minutes.

5. The process of claim 4 wherein said citrus juice is a juice of citrus fruit selected from a group consisting of orange, grapefruit, and lemon.

* * * * *

REEXAMINATION CERTIFICATE (2482nd)

United States Patent [19]

Tamaki et al.

[11] B1 5,049,402

[45] Certificate Issued   Feb. 14, 1995

[54] PROCESS FOR MINIMIZING BITTERNESS IN CITRUS FRUIT JUICE

[75] Inventors: Yoji Tamaki, Kagamigahara; Osamu Mutsushika, Kasugai; Hiroaki Mieda, Nagoya, all of Japan

[73] Assignee: Pokka Corporation, Nagoya, Japan

Reexamination Request:
No. 90/003,176, Aug. 27, 1993

Reexamination Certificate for:
Patent No.: 5,049,402
Issued: Sep. 17, 1991
Appl. No.: 469,085
Filed: Jan. 23, 1990

[30] Foreign Application Priority Data

Aug. 3, 1989 [JP] Japan .................................. 1-200333
Dec. 5, 1989 [JP] Japan .................................. 1-314164

[51] Int. Cl.$^6$ ................................................. A23L 2/06
[52] U.S. Cl. ..................................... 426/599; 426/616

[56] References Cited

PUBLICATIONS

Nagy, 1977 Citrus Science and Technology vol. 1 AVI Publishing Co., Inc Westport Conn. pp. 377–392.
Ogawa, Food Science '89 vol. 31, No. 2 pp. 87–92 (partial translation).

*Primary Examiner*—Carolyn Paden

[57] ABSTRACT

Citrus fruit juice beverages with minimized bitterness can be obtained by treating citrus fruit juice under a pressure of at least 2000 Kg/cm$^2$.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *